(12) United States Patent
Kawaida et al.

(10) Patent No.: US 9,632,227 B2
(45) Date of Patent: Apr. 25, 2017

(54) LIGHT GUIDE BODY

(75) Inventors: Yoshiaki Kawaida, Hamamatsu (JP); Masaki Yamamoto, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/118,844

(22) PCT Filed: May 18, 2012

(86) PCT No.: PCT/JP2012/062868
§ 371 (c)(1),
(2), (4) Date: Nov. 19, 2013

(87) PCT Pub. No.: WO2012/161140
PCT Pub. Date: Nov. 29, 2012

(65) Prior Publication Data
US 2014/0105560 A1    Apr. 17, 2014

(30) Foreign Application Priority Data

May 20, 2011 (JP) ................................ 2011-114024
Jun. 20, 2011 (JP) ................................ 2011-136545

(51) Int. Cl.
| G02B 6/10 | (2006.01) |
| G02B 23/00 | (2006.01) |
| F21V 8/00 | (2006.01) |
| G02B 6/42 | (2006.01) |
| H04N 5/64 | (2006.01) |

(52) U.S. Cl.
CPC .......... G02B 6/0011 (2013.01); G02B 6/4214 (2013.01); H04N 5/64 (2013.01)

(58) Field of Classification Search
USPC ............................................ 385/146; 362/558
See application file for complete search history.

(56) References Cited

U.S. PATENT DOCUMENTS

| 4,954,930 A | 9/1990 | Maegawa et al. |
| 5,747,796 A | 5/1998 | Heard et al. |
| 6,464,366 B1 * | 10/2002 | Lin ..................... G02B 6/0033 358/484 |

(Continued)

FOREIGN PATENT DOCUMENTS

| EP | 2 241 799 A1 | 10/2010 |
| JP | 64-63903 A | 3/1989 |

(Continued)

OTHER PUBLICATIONS

International Search Report with English translation dated Jul. 17, 2012 ( 9 pages).

(Continued)

*Primary Examiner* — Eric Wong
(74) *Attorney, Agent, or Firm* — Crowell & Moring LLP

(57) ABSTRACT

A light guide body includes: a light incident portion on which light is incident; a light guiding portion which is adapted to guide the light incident on the light incident portion; and a light emitting portion which is adapted to emit the light guided by the light guiding portion. One of the light incident portion and the light guiding portion is extended in a first direction, and the light emitting portion is extended in a second direction which is perpendicular to the first direction.

8 Claims, 15 Drawing Sheets

(56) References Cited

U.S. PATENT DOCUMENTS

| | | | |
|---|---|---|---|
| 8,696,184 B2 * | 4/2014 | Morino | G02B 6/002 362/608 |
| 2001/0012157 A1 * | 8/2001 | Suzuki | G02B 6/0018 359/599 |
| 2004/0033007 A1 | 2/2004 | Ohtsu et al. | |
| 2006/0209561 A1 * | 9/2006 | Tenmyo | 362/602 |
| 2007/0236909 A1 * | 10/2007 | Tamura | B60Q 3/004 362/23.01 |
| 2009/0079099 A1 | 3/2009 | Shimizu et al. | |
| 2013/0051076 A1 * | 2/2013 | Mizuno | G02B 6/002 362/613 |
| 2014/0225128 A1 * | 8/2014 | Liu | H02S 10/40 257/80 |

FOREIGN PATENT DOCUMENTS

| | | |
|---|---|---|
| JP | 4-55891 U | 5/1992 |
| JP | 6-313817 A | 11/1994 |
| JP | 7-212318 A | 8/1995 |
| JP | 8-191493 A | 7/1996 |
| JP | 9-27884 A | 1/1997 |
| JP | 9-275591 A | 10/1997 |
| JP | 2001-222905 A | 8/2001 |
| JP | 2001-305976 A | 11/2001 |
| JP | 2004-29507 A | 1/2004 |
| JP | 2004-226941 A | 8/2004 |
| JP | 2004-361664 A | 12/2004 |
| JP | 2005-62298 A | 3/2005 |
| JP | 2008-78896 A | 4/2008 |
| JP | 2009-20328 A | 1/2009 |
| JP | 2009-75288 A | 4/2009 |
| JP | 2009-267956 A | 11/2009 |

OTHER PUBLICATIONS

Japanese-language Written Opinion dated Jul. 17, 2012 (8 pages).
Shioda et al., "Bending Stable Polyimide Waveguide Film" with English translation, Sep. 7, 2005, IEICE Electronics Express, The Institute of Electronics, Information and Communication Engineers, 6 pages.
Japanese-language Office Action with English translation dated Nov. 13, 2012 (9 pages).
Partial Supplementary European Search Report dated Nov. 13, 2014 (six (6) pages).
European Search Report dated Jan. 29, 2015 (11 pages).
Chinese Office Action issued in counterpart Chinese Application No. 201280024601.5 dated Sep. 25, 2015 with English translation (17 pages).
Chinese Office Action issued in counterpart Chinese Application No. 201280024601.5 dated May 25, 2016 with English translation (18 pages).
English Translation of document C2 (Written Opinion) previously filed Jul. 17, 2012 (fourteen (14) pages).
Chinese-language Office Action issued in counterpart Chinese Application No. 201280024601.5 dated Nov. 28, 2016 with English translation (Sixteen (16) pages).

* cited by examiner

| W | X1 | X2 |
|---|----|----|
| =2r | 1 | 1 |
| ×0.9 | 2 | 1.2 |
| ⋮ | ⋮ | ⋮ |
| ×0.4 | 4 | Max |
| ⋮ | ⋮ | ⋮ |
| 0.1 | 10 | 0 |

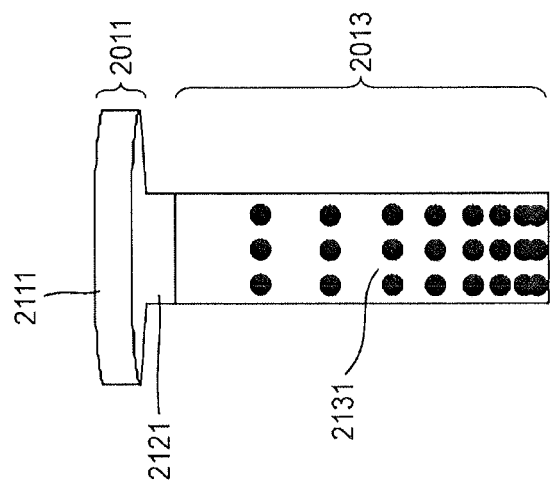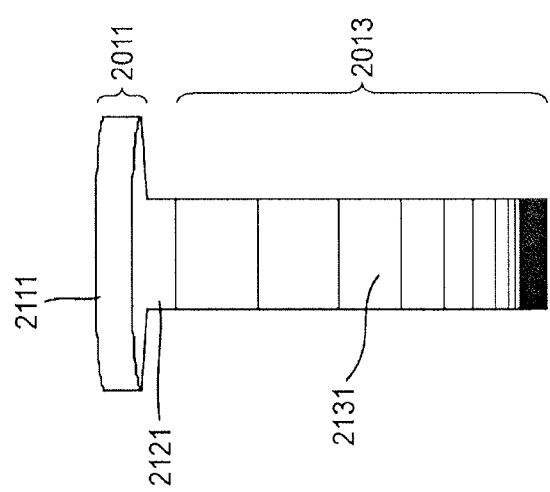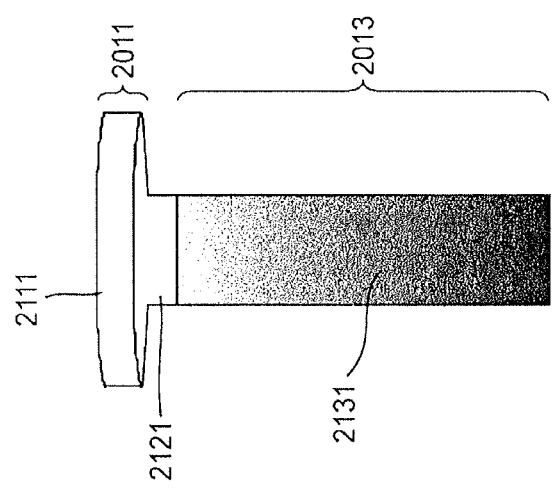

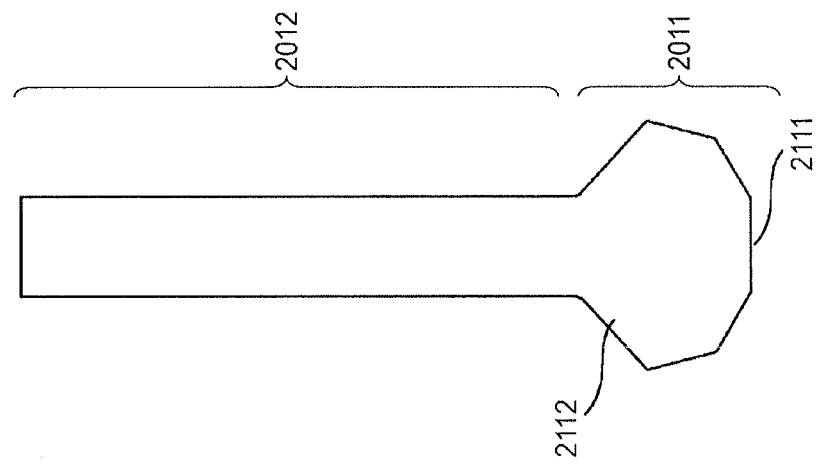
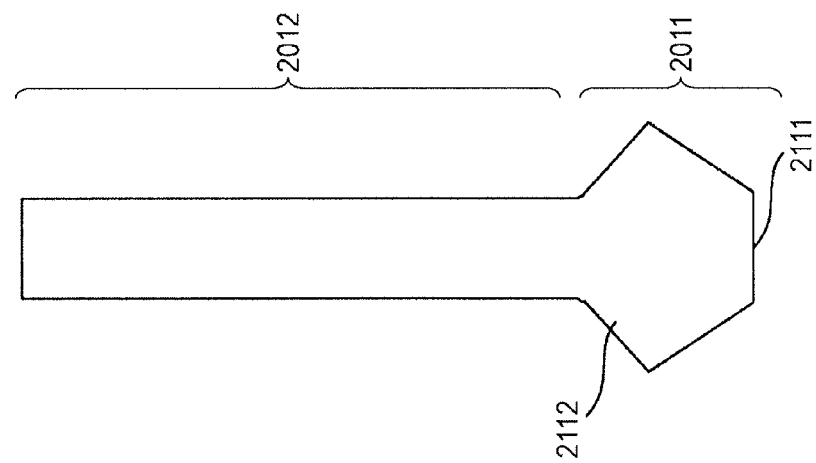

LIGHT GUIDE BODY

TECHNICAL FIELD

The present invention relates to a light guide body which guides incident light, particularly an infrared signal while totally reflecting the light, and which emits the light from a position that is different from the incident position.

BACKGROUND ART

Even in an ordinary household, recently, speakers are often connected to an AV (Audio Visual) apparatus such as a television receiver or a player in order to reproduce sound with a sense of presence. As a such speaker, a so-called bar speaker which is used while being disposed in front of a television stand has been proposed (see Patent Document 1). A bar speaker is configured by arranging a plurality of speakers in one bar-like housing. However, a light receiving section which receives an infrared signal output from a remote controller is often disposed in a lower portion of a television receiver. In the case where a bar speaker is mounted, the light receiving section is hidden by the bar speaker, and there arises a problem in that the television receiver cannot receive the infrared signal from the remote controller.

Therefore, a technique has been proposed in which an infrared signal emitted from the front of a bar speaker is refracted to advance behind the bar speaker, so that a light receiving section of a television receiver can receive the infrared signal. As disclosed in Patent Document 2, for example, it is contemplated to use an acrylic resin or the like which refracts light. In Patent Document 2, a housing of a liquid crystal display device is made of an acrylic resin or the like, and, in the housing, light emitted from a light source is refracted a plurality of times to be efficiently guided to an optical displaying section. As in Patent Document 2, by using the light guide member made of an acrylic resin or the like, the light guide member is disposed so as to extend on, for example, the upper and back surfaces of the housing of the bar speaker, whereby the infrared signal emitted from the front of the bar speaker is refracted so as to be able to be guided to the light receiving section of the television receiver which is located on the side of the back surface of the bar speaker.

As in Patent Document 3, for example, it is contemplated that a relay apparatus which relays an operation signal of a remote controller is interposed between the remote controller and a television receiver. When the user operates the remote controller to transmit the operation signal, the relay apparatus of Patent Document 3 transmits the operation signal received from the remote controller, to the television receiver.

PRIOR ART REFERENCE

Patent Documents

Patent Document 1: JP-A-2009-267956
Patent Document 2: JP-A-2004-361664
Patent Document 3: JP-A-09-275591

SUMMARY OF THE INVENTION

Problems that the Invention is to Solve

In the case where, by using the light guide member, the infrared signal emitted from the front of the bar speaker is to be received by the light receiving section of the television receiver which is located on the back surface side of the bar speaker, the user does not always operate the remote controller in the same position, and therefore it is requested to allow a wider incidence angle for the infrared signal with respect to the light guide member. Moreover, a light receiving section of a television receiver is not always disposed in the same position in all television receivers. Particularly, a position change in the width direction of a television receiver can be easily coped by displacing the disposed light guide member in the width direction. However, a position change in the height direction is not easily performed, and it is desired to enable the change to be easily coped with.

Even when a relay apparatus such as disclosed in Patent Document 3 is disposed, it is not easy to change the disposition position in the width direction of the television receiver, and therefore there is a problem in place where a relay apparatus is disposed.

Therefore, it is an object of the invention to provide a light guide body which allows a wider incidence angle of light, and which can surely guide light to a desired position.

It is another object of the invention to provide a light guide body which, even when a light receiving section of a television receiver is disposed in any position, can surely guide light to a desired position.

Means for Solving the Problems

According to the invention, there is provided a light guide body comprising: a light incident portion on which light is incident; a light guiding portion which is adapted to guide the light incident on the light incident portion; and a light emitting portion which is adapted to emit the light guided by the light guiding portion, wherein one of the light incident portion and the light guiding portion is extended in a first direction, and the light emitting portion is extended in a second direction which is perpendicular to the first direction.

In the light guide body of the invention, the light incident portion is extended in the first direction, and the light incident portion has a light incident surface on which the light is incident and which has a shape that is elongated in the first direction, the light emitting portion which is extended in the second direction has a light emitting surface which has a shape that is elongated in the second direction, and the light guiding portion has a light guiding path which is adapted to guide the light incident on the light incident surface to the light emitting surface.

The first direction may be the width direction, and the second direction may be the height direction.

In this configuration, the light incident on the light incident surface which is wide in the first direction is guided along the surface direction of the light incident surface, to the light emitting surface which is wide in the second direction perpendicular to the first direction, and then emitted from the light emitting surface. According to the configuration, in the case where the first direction is the width direction of a television receiver and the second direction is the height direction, when the light guide body is mounted in a position which coincides with a light receiving section of the television receiver in width direction, for example, an infrared signal for operating the television receiver can be emitted to the light receiving section irrespective of the height level of the light receiving section. In this case, moreover, the light incident surface is wide in the width direction (first direction), and therefore incidence of light from a range which is wide in the width direction can be allowed.

The light guide body of the invention further comprises a reflective portion having a reflective surface which is disposed in opposition to the light incident surface and which is adapted to reflect the light incident on the light incident surface to the light guiding path, and the light guiding path is adapted to guide the light reflected by the reflective surface to the light emitting surface.

In this configuration, for example, light which is incident along the normal direction (horizontal direction) of the light incident surface can be reflected in the vertical direction by an inclined surface, and therefore it is possible to prevent the light guide body from being enlarged in the normal direction.

In the light guide body of the invention, the light emitting surface is adapted to emit the light in the normal direction of the light incident surface on a side of the reflective surface.

In this configuration, light can be emitted in a direction substantially same as the travel direction of the light incident on the light incident surface. Even when a bar speaker is mounted in front of a television receiver as described above, therefore, the infrared signal emitted from a remote controller which is operated in front of the television receiver can be guided to a light receiving section of the television receiver.

In the light guide body of the invention, the light guiding portion is a light guide member in which the light incident surface and the light emitting surface are formed, a plurality of slits are formed in the light guide member, and the light guiding path is defined between the plurality of slits.

In this configuration, the light guiding path is formed by disposing the slits, whereby the width of the light guiding path can be adjusted. When the width of the light guiding path is adjusted, incident light can be totally reflected by the light guiding path, and guided to the light emitting surface surely and wastelessly.

In the light guide body of the invention, the light guide member has a sector shape having a central angle of about 90 degrees, the light incident surface and the reflective surface are formed in linear portions of the sector shape of the light guide member, and the plurality of slits have an arcuate shape which is centered at an intersection of the two linear portions, the intersection being a center part of the sector shape of the light guide member.

In this configuration, the center of the arcuate shape of the plurality of slits is set as the center part (intersection of the two linear portions of the sector shape) of the sector-like light guide member. Therefore, the size (radius) of the slits can be easily adjusted. As a result, also the width of the light guiding path can be easily adjusted.

In the light guide body of the invention, the light guiding path has a width which is determined by a radius of the arcuate shape of the slits.

In this configuration, the width of the light guiding path is adjusted by the slits. The total reflection of the light which is incident through the arcuate light guiding path is affected by the width of the light guiding path. Therefore, the radius of the arc of the slits is determined in conformity with the size of light guide body, and the width of the arcuate light guiding path is determined from the radius, whereby an optimum light guiding portion can be formed without enlarging the light guide body itself.

In the light guide body of the invention, the light guiding path has a linear light guiding path which is disposed in a vicinity of the center part of the sector shape of the light guide member, which is adapted to guide the light reflected by the reflective surface to the light emitting surface, and which has a linear shape.

In this configuration, the linear light guiding path is disposed in the vicinity of the middle part of the light guide member. Even in an area where an arcuate light guiding path cannot be formed, therefore, the formation of the light guiding path enables infrared rays to be guided to the whole light emitting surface. When infrared rays are emitted from the whole light emitting surface to the outside, consequently, the infrared rays can be emitted more surely to the emission destination such as the light receiving section.

The light guide body of the invention includes two light guide members each of which is formed with the light incident surface and the light emitting surface, wherein the two light guide members are integrally formed so that the light emitting surfaces of the light guide members are opposed to each other, and the two light guide members are bilaterally symmetric about a straight line which is elongated along between the opposed light emitting surfaces.

In this configuration, the light incident surface can be further widened in the width direction, and therefore the incidence of light from a wider range in the width direction can be allowed.

In the light guide body of the invention, the light guiding portion is extended in the first direction, the light incident portion has a light incident surface on which the light is incident, the light guiding portion is adapted to guide the light incident on the light incident surface in a depth direction which is the first direction and which is perpendicular to a width direction and a height direction that is the second direction, and includes a mounting surface, and the light emitting portion which is extended in the second direction has a light emitting surface in a position which is different in the height direction from the mounting surface, and is adapted to emit the light guided by the light guiding portion from the light emitting surface in the depth direction.

When the light guide body having the light emitting surface in the position which is different from the mounting surface in the height direction as described above is mounted on a bar speaker or the like, the infrared rays of the remote controller can reach the light receiving section of the television receiver which is hidden by the bar speaker. When the light guide body is simply mounted on a bar speaker or the like, particularly, the position in the width direction can be easily changed. Even when the light receiving section of the television receiver is disposed in any position, therefore, the light guide body can easily guide light to a desired position.

In the light guide body of the invention, when the shape of the light incident surface is a shape which has a curved surface or a shape which has a plurality of flat surfaces, a wider incidence angle of light can be allowed. When the light emitting surface is elongated in the height direction, light can be widely emitted in the height direction. Even when the user operates the remote controller in any position in front of the television receiver, and even when the light receiving section of the television receiver exists in any position, therefore, the infrared rays of the remote controller can adequately reach the light receiving section of the television receiver.

Preferably, the light incident portion has a squeezed portion in which a width is gradually reduced from the light incident surface toward the light guiding portion, and the light guiding portion has a width which is determined by the width of the squeezed portion.

In this case, since the light incident portion is gradually narrowed, the amount of light guided to the light guiding portion can be increased. The further the width is narrowed, the further infrared rays from the front direction are focused, and can be guided to the light guiding portion with a larger amount of light. When the width is excessively small, however, infrared rays in a direction other than the front direction are not guided, and the amount of light is reduced. Therefore, it is preferable to determine the width of the light guiding portion in accordance with the width of the squeezed portion (the width of the light incident surface) so that also infrared rays in a direction other than the front direction can be guided with a large amount of light.

Moreover, it is preferable that the light guiding portion has an arcuate light guiding path having an arcuate shape which is bent from the depth direction to the height direction, and the arcuate light guiding path has a thickness which is determined by a radius of the arcuate shape.

In this case, the light guiding portion has the light guiding path which is bent into an arcuate shape, and therefore infrared rays in the light guiding portion move in the height direction while repeating total reflection. When the radius of the arc is large, however, the light guide body becomes excessively large in size. Therefore, it is preferable that the radius is as small as possible. The larger the thickness, the larger amount of infrared rays in, particularly, the height direction can be guided. However, the smaller the radius and the larger the thickness, the higher the possibility that infrared rays in the light guiding portion are emitted from the interface. Therefore, it is preferable that the thickness is reduced to a degree at which infrared rays in the height direction can be guided from a desired angle (for example, a degree at which infrared rays that reach from an angle of about 60 degrees with respect to the horizontal plane can be guided), thereby causing infrared rays in the light guiding portion to be totally reflected.

Preferably, the light emitting portion is thinner as further separating from the light guiding portion.

In the light emitting portion, light is reflected by a reflection pattern which is disposed on the surface opposed to the light emitting surface, and emitted from the light emitting surface. Therefore, the remoter from the light guiding portion, the smaller amount of light, and the smaller amount of emitted light. Consequently, the configuration where the light emitting portion is thinner as further separating from the light guiding portion is employed, so that, the remoter from the light guiding portion, the larger rate of reflection, and light is emitted with a uniform amount of light.

Effects of the Invention

According to the invention, a wider incidence angle of light can be allowed, and light can be surely guided to a desired position.

According to this invention, a wider incidence angle of light can be allowed, and light can be surely guided to a desired position.

BRIEF DESCRIPTION OF THE DRAWINGS

FIGS. 14(A) to 14(C) are views showing modifications of a reflection pattern.

FIGS. 15(A) and 15(B) are views showing modifications of a light incident portion.

MODE FOR CARRYING OUT THE INVENTION

Hereinafter, preferred embodiments of the light guide body of the invention will be described with reference to the drawings.

Hereinafter, a light guide body (light guide module) of a first embodiment of the invention will be described.

Figure 1A:
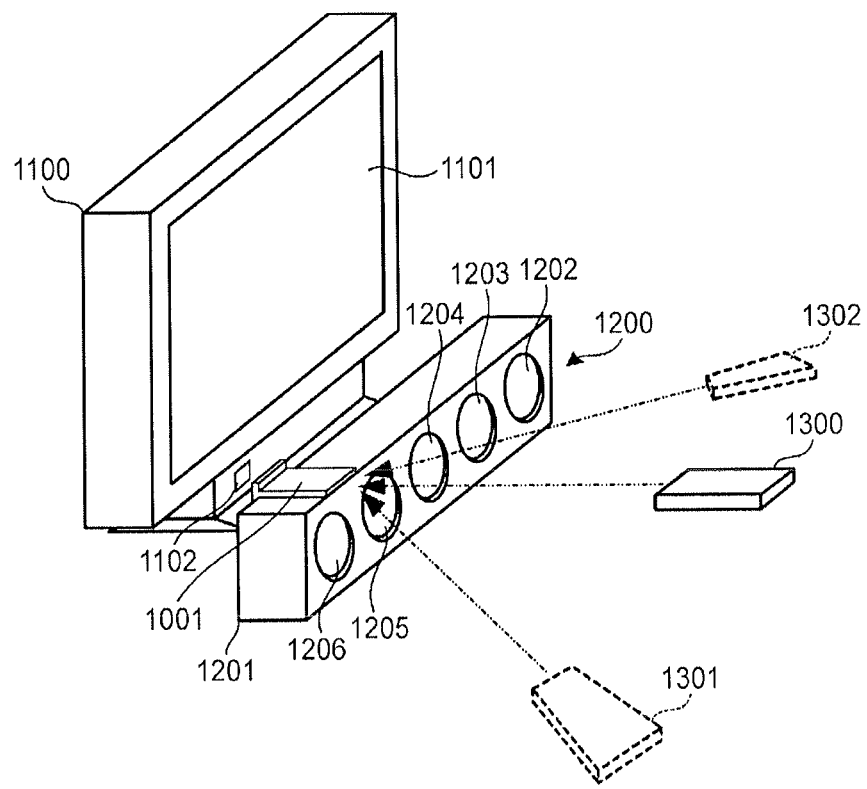
FIGS. 1(A) and 1(B) are views showing a mounting state of a light guide module of a first embodiment.
Figure 1B:
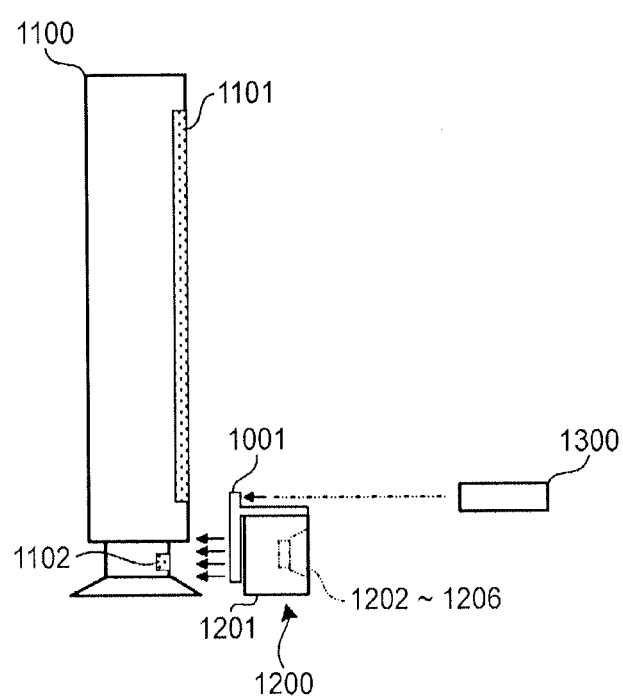

FIGS. 1(A) and 1(B) are views showing a mounting state of the light guide module of the first embodiment. In the embodiment, a bar speaker 1200 is mounted in front of a television receiver 1100, more specifically, in front of a television stand of the television receiver 1100, and so as not to overlap in the height direction with the display screen 1101 of the television receiver 1100. FIG. 1(A) is a perspective view of a state where the bar speaker 1200 is mounted in front of the television receiver 1100, and FIG. 1(B) is a side elevation view.

The television receiver 1100 includes a light receiving section 1102 which receives an infrared signal (hereinafter, referred to as infrared rays) functioning as an operation signal. The infrared rays which are to be received by the light receiving section 1102 are transmitted from a remote controller 1300 for the television receiver 1100. The light receiving section 1102 is disposed below the display screen 1101. In the embodiment, the bar speaker 1200 is disposed so as to be opposed to a panel in which the light receiving section 1102 is disposed. Therefore, the light receiving section 1102 is shielded by the bar speaker 1200, and cannot directly receive the infrared rays from the remote controller 1300.

The bar speaker 1200 has a housing 1201 having a rectangular parallelepiped shape which is elongated in one direction. The bar speaker 1200 is mounted in front of the television receiver 1100 so that the longitudinal direction of the housing 1201 coincides with the width direction of the television receiver 1100, and one surface (hereinafter, this surface is referred to as back surface) of the housing 1201 is on the side of the television receiver 1100. The bar speaker 1200 includes a plurality of speakers 1202, 1203, 1204, 1205, 1206. The speakers 1202 to 1206 are disposed along the longitudinal direction of the surface (hereinafter, this surface is referred to as front surface) which is parallel to the back surface of the housing 1201. The bar speaker 1200 is connected to the television receiver 1100 through wirings which are not shown, receives an audio signal from the television receiver 1100, and forward emits sounds from the speakers 1202 to 1206.

A light guide module 1001 is mounted in the bar speaker 1200. As shown in FIG. 1(A), the light guide module 1001 is mounted in a position which coincides with the light receiving section 1102 of the television receiver 1100 in the width direction, and along the upper and back surfaces of the housing 1201 of the bar speaker 1200. The light guide module 1001 is configured so that, when the remote controller 1300 is operated, and the infrared rays irradiated in front of the bar speaker 1200 are incident as indicated by the broken-line arrow in FIG. 1(B), the infrared rays repeat total reflection inside the module, and are emitted in the normal direction (the solid-line arrow in FIG. 1(B)) of the back surface of the housing 1201.

The infrared rays emitted from the light guide module 1001 are received by the light receiving section 1102 of the television receiver 1100. In this way, even when the light receiving section 1102 is shielded by the bar speaker 1200, the television receiver 1100 can receive the infrared rays through the light guide module 1001.

It is assumed that the light guide module 1001 of the embodiment is configured so as to emit the infrared rays from the remote controller 1300 which are incident in a range of the incidence angle from 0 degrees to about (±) 60 degrees, in the normal direction of the back surface of the housing 1201. More specifically, in the case where the incidence angle of the infrared rays from the remote controller 1300 which is located at the front of the light guide module 1001 is 0 degrees, the light guide module 1001 emits in the normal direction of the back surface of the housing 1201, also infrared rays from a remote controller 1301 or remote controller 1302 which is moved rightward or leftward by 60 degrees about the position in the horizontal direction. Therefore, the user can operate the remote controller in a position of the wide range extending about the light guide module 1001.

Figure 2A:
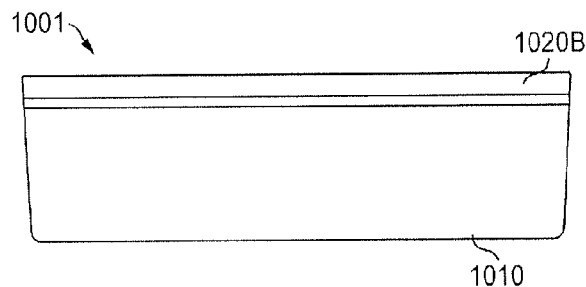
FIG. 2(A) is a top view of the light guide module of the first embodiment.
Figure 2B:
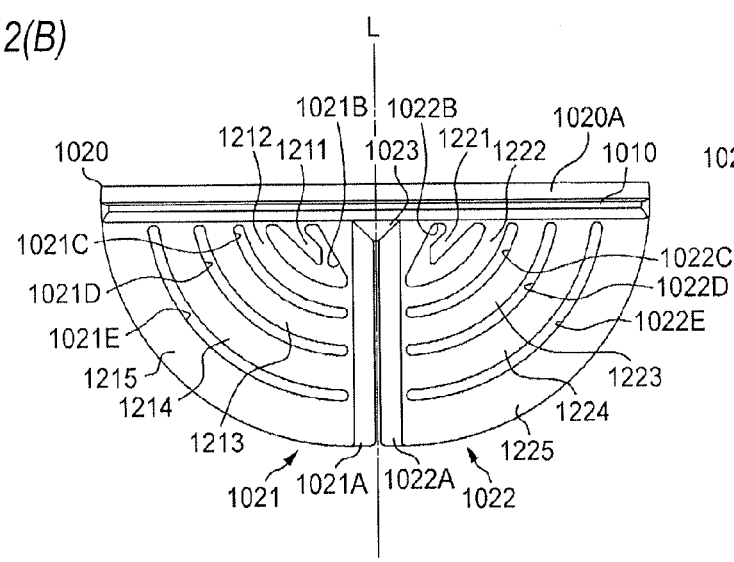
FIG. 2(B) is a front view.
Figure 2D:
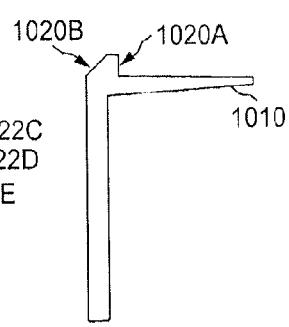
FIG. 2(D) is a side view.
Figure 2C:
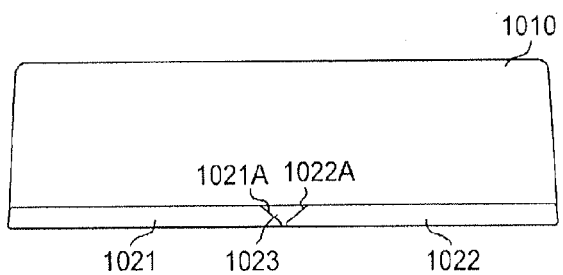
FIG. 2(C) is a bottom view.
Figure 3:
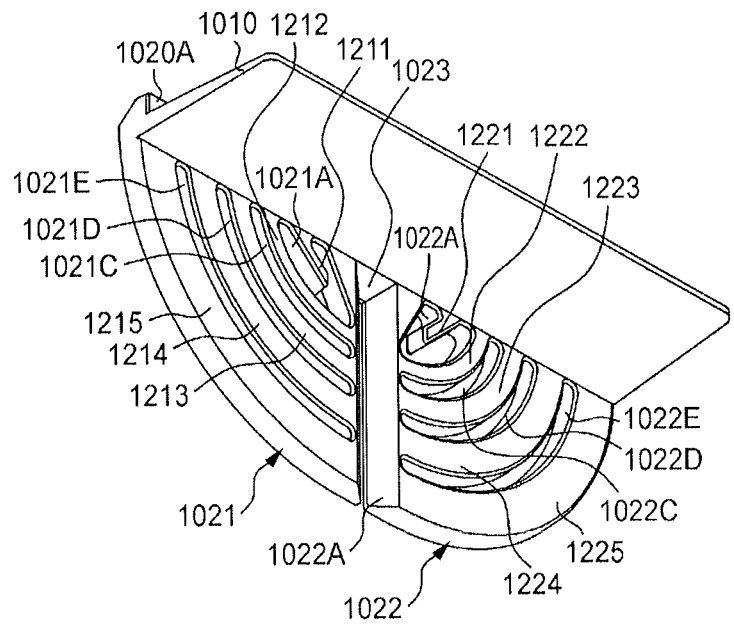
FIG. 3 is a perspective view of the light guide module of the first embodiment as viewed from the lower side.

Hereinafter, the configuration of the light guide module 1001 will be specifically described in detail. FIG. 2(A) is a top view of the light guide module 1001, FIG. 2(B) is a front view, FIG. 2(C) is a bottom view, and FIG. 2(D) is a side view. FIG. 3 is a perspective view of the light guide module 1001 as viewed from the lower side.

The light guide module 1001 is formed of, for example, an acrylic resin, and includes a mounting portion 1010 and a body portion 1020. The mounting portion 1010 has a plate-like shape which is substantially trapezoidal in a side view, and is disposed approximately perpendicularly to one surface of the body portion 1020. When the light guide module 1001 is to be mounted on the bar speaker 1200, the mounting portion 1010 is placed on the upper surface of the housing 1201 of the bar speaker 1200.

The body portion 1020 is a plate-like light guide member having a thickness of about 4 mm, and has a substantially semicircular shape in a front view. The mounting portion 1010 is disposed approximately perpendicularly to a portion which is separated by a predetermined distance (for example, about 4 mm) from the diameter-side end portion of one surface of the body portion 1020. When the mounting portion 1010 is placed on the upper surface of the housing 1201 of the bar speaker 1200, therefore, the body portion 1020 is placed substantially parallel to the back surface of the housing 1201 in a state where a portion forming the diameter of the semicircle (hereinafter, the portion is referred to as diameter portion) is in the upper side, and the arcuate edge portion (hereinafter, referred to as arcuate portion) is in the lower side (see FIG. 1(B)).

Hereinafter, the surface of the body portion 1020 opposed to the back surface of the housing 1201, i.e., the surface on which the mounting portion 1010 is disposed is referred to as the front surface, and the surface opposite to the surface is referred to as the rear surface (back surface). In the case where the light guide module 1001 is mounted on the bar speaker 1200, the back surface of the body portion 1020 is on the side of the light receiving section 1102 of the television receiver 1100.

As shown in FIG. 2(B), a light incident surface (light incident portion) 1020A is formed between the diameter portion of the front surface of the body portion 1020 and the mounting portion 1010. The light incident surface 1020A is a surface on which infrared rays from the remote controller 1300 are to be incident, and has a rectangular shape in which the longitudinal direction coincides with the width direction of the light guide module 1001.

As shown in FIG. 2(D), the body portion 1020 has an inclined surface (hereinafter, referred to as incident reflective surface (reflective portion)) 1020B which is formed by cutting away the back surface side of the diameter portion by about 45 degrees. The incident reflective surface 1020B is formed so as to be opposed to the light incident surface 1020A. Although described later in detail, infrared rays which are incident through the light incident surface 1020A are totally reflected by the incident reflective surface 1020B, and then directed toward a portion which is below the incident reflective surface 1020B, and which is in the body portion 1020, i.e., the arcuate portion.

As shown in FIG. 2(B), the body portion 1020 has light guiding plates (light guiding portion) 1021, 1022 which have a sector shape having a central angle of about 90 degrees, and the light guiding plates 1021, 1022 are integrally formed to constitute a semicircular shape. The light guiding plates 1021, 1022 have light emitting portions (light emitting surfaces) 1021A, 1022A which are formed along the center line L of the semicircle. The light emitting portions 1021A, 1022A have a rectangular shape in which the longitudinal direction coincides with the direction along the center line L, and an inclined surface which is formed by cutting away by about 45 degrees. Infrared rays which are incident through the light incident surface 1020A, and which are reflected by the incident reflective surface 1020B are totally reflected in the light guiding plates 1021, 1022, and guided to the light emitting portions 1021A, 1022A. Then, the infrared rays are reflected by the inclined surfaces of the light emitting portions 1021A, 1022A which form an angle of 45 degrees, and emitted from the side of the back surface of the body portion 1020 (see the broken-line arrow in FIG. 1(B)).

In the light emitting portions 1021A, 1022A, the long sides may be in close contact with each other so that the inclined surfaces form an apex, or a small gap may be disposed therebetween. FIG. 2(B) shows the configuration where a gap is disposed. An inclined surface 1023 which is inclined at about 45 degrees is disposed below a middle portion in the longitudinal direction of the light incident surface 1020A, and in end portions (on the side of the mounting portion 1010) in the longitudinal direction of the light emitting portions 1021A, 1022A. In the case where infrared rays are incident through the middle portion in the longitudinal direction of the light incident surface 1020A, infrared rays which are reflected in the vertically downward direction by the incident reflective surface 1020B are emitted toward the back surface of the light guide module 1001 by the inclined surface 1023 which is inclined at 45 degrees.

Hereinafter, light guiding paths which, in the light guiding plates 1021, 1022, guide the incident infrared rays to the light emitting portions 1021A, 1022A will be specifically described. The light guiding plates 1021, 1022 are formed into the same shape so as to be bilaterally symmetric about the center line of the semicircular body portion 1020. Therefore, only the light guiding plate 1021 will be described. With respect to the light guiding plate 1022, a corresponding reference numeral(s) is indicated in parentheses. In the following description, the term center portion (intersection) means the center of the semicircle of the body portion 1020.

A hole 1021B (1022B) which forms the light guiding path 1211 (1221) that is inclined by about 45 degrees with respect to the diameter of the body portion 1020 is disposed in the vicinity of the center portion of the light guiding plate 1021 (1022). An end portion of the light guiding path 1211 (1221) is formed so as to be parallel to the longitudinal direction of the light emitting portion 1021A (1022A).

In the hole 1021B (1022B) which forms the light guiding path 1211 (1221), a portion opposed to the end portion of the light guiding path 1211 (1221) is formed as a surface inclined by a predetermined angle with respect to the longitudinal direction of the light emitting portion 1021A (1022A). Although described later in detail, infrared rays which are emitted from the end portion of the light guiding path 1211 (1221) are refracted by the inclined surface of the hole 1021B (1022B), and directed from the width direction to an obliquely upward direction.

In the light guiding plate 1021 (1022), arcuate slits 1021C, 1021D, 1021E (1022C, 1022D, 1022E) which are centered at the center portion are formed in sequence starting from the center portion toward the end portion of the arcuate side. The formation of the hole 1021B (1022B) and the slits 1021C, 1021D, 1021E (1022C, 1022D, 1022E) causes arcuate light guiding paths 1212, 1213, 1214, 1215 (1222, 1223, 1224, 1225) which guide infrared rays, to be formed therebetween.

The light guiding paths 1212, 1213, 1214, 1215 (1222, 1223, 1224, 1225) which are formed by the arcuate slits 1021C, 1021D, 1021E (1022C, 1022D, 1022E) have an R-shape. When the radii of the light guiding paths 1212, 1213, 1214, 1215 (1222, 1223, 1224, 1225) are small, therefore, the incidence angles of the infrared rays with respect to the interfaces of the light guiding paths 1212, 1213, 1214, 1215 (1222, 1223, 1224, 1225) are close to be vertical, and incident infrared rays are sometimes transmitted through the R-portions so as not to be totally reflected. In this case, the infrared rays are not guided to the light emitting portion 1021A. Therefore, the light guiding paths 1212, 1213, 1214, 1215 (1222, 1223, 1224, 1225) must be formed to have a predetermined width so that infrared rays are totally reflected therein.

Figure 4:
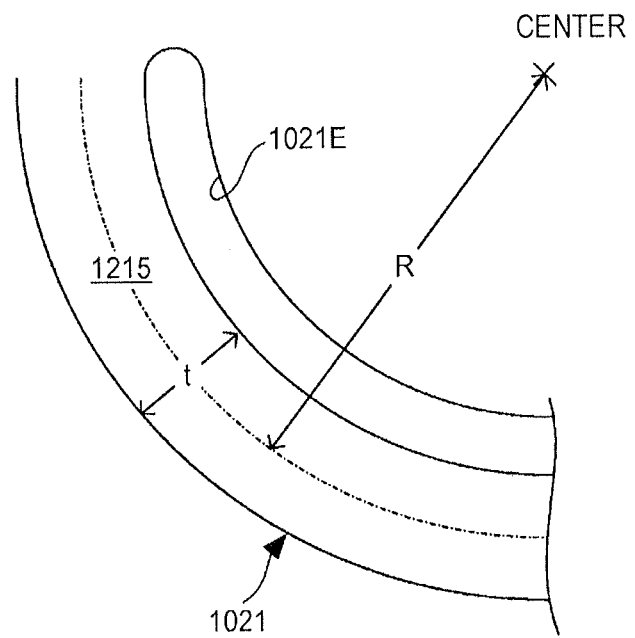
FIG. 4 is a diagram illustrating a method of determining the width of a light guiding path in which infrared rays are totally reflected.

FIG. 4 is a diagram illustrating a method of determining the width of the light guiding path 1215 in which infrared rays are totally reflected. Although the method of determining the width of the light guiding path 1215 is described with reference to FIG. 4, the widths of the other light guiding paths 1212, 1213, 1214 (1222, 1223, 1224) are similarly determined. In FIG. 4, the arcuate light guiding path 1215 has a radius of R, and the width of the light guiding path 1215 is t. The radius R is the distance from the center of the body portion 1020 to an arc (the dash-dot line in the figure) which passes through the middle of the width of the light guiding path 1215.

The light guiding path 1215 guides infrared rays which are incident through the light incident surface 1020A, and which are reflected from the incident reflective surface 1020B, to the light emitting portion 1021A. Since the light guiding path 1215 has an R-shape as described above, however, incident infrared rays are transmitted through the R-portions so as not to be totally reflected, thereby causing the infrared rays not to be guided to the light emitting portion 1021A. When the radius R is increased in order to avoid this, infrared rays are totally reflected in the light guiding path 1215, but on the other hand the light guide module 1001 is enlarged in size. Therefore, the width t of the light guiding path 1215 is reduced, whereby infrared rays are caused to be totally reflected in the light guiding path 1215.

Figure 5:
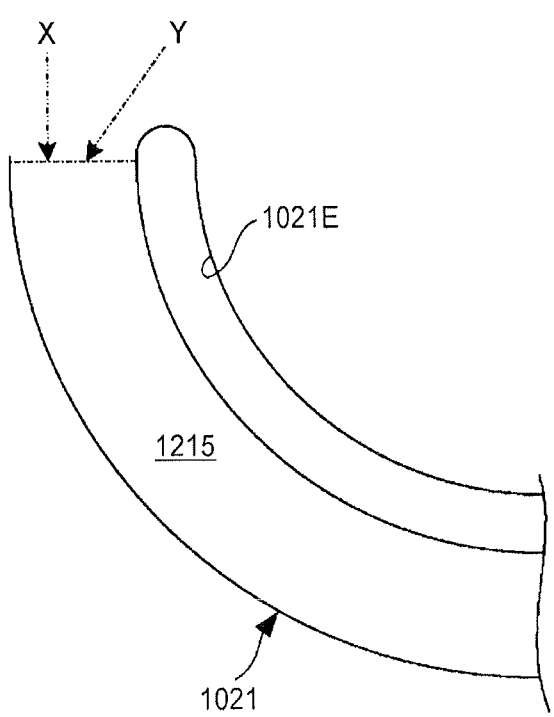
FIG. 5 is a view diagrammatically showing the incidence angle of infrared rays with respect to the light guiding path.

The radius R and the width t are determined in consideration of the incidence angle of infrared rays with respect to the light guiding path 1215. FIG. 5 is a view diagrammatically showing the incidence angle of infrared rays with respect to the light guiding path 1215. The linear dash-dot line in FIG. 5 indicates an entrance portion (incident port for infrared rays) of the light guiding path 1215 which extends along the width direction of the light guide module 1001, i.e., the longitudinal direction of the light incident surface 1020A.

In the case where infrared rays are incident at an incidence angle of 0 degrees, on the light incident surface 1020A of the light guide module 1001, the infrared rays are reflected in the vertically downward direction by the incident reflective surface 1020B. In this case, with respect to the entrance portion of the light guiding path 1215, as indicated by the broken-line arrow X in the figure, the infrared rays are incident at an incidence angle of 0 degrees, also on the light guiding path 1215.

By contrast, in the case where infrared rays are incident in an oblique direction on the light incident surface 1020A of the light guide module 1001, the infrared rays are reflected not in the vertically downward direction but in an obliquely downward direction, by the incident reflective surface 1020B. In this case, as indicated by the broken-line arrow Y in the figure, the infrared rays are incident in an obliquely direction, also on the entrance portion of the light guiding path 1215.

In both of the broken-line arrows X, Y in the figure, the radius R and the width t are determined so that total reflection occurs in the light guiding path 1215. In the embodiment, the radius R and the width t are determined so that infrared rays which are incident at an incidence angle (the incidence angles of infrared rays from the remote controllers 1301, 1302 shown in FIG. 1(A)) of a range from 0 degrees to about (±) 60 degrees are totally reflected in the light guiding path 1215. The relationship which satisfies this is R=t×5. When the size of the light guide module 1001 is determined, namely, the radius R is determined. In accordance with the radius R, the width t of each of the light guiding paths 1212 to 1215 (1222 to 1225) is determined. Then, the slits 1021C, 1021D, 1021E (1022C, 1022D, 1022E) are formed so that the light guiding paths 1212 to 1215 (1222 to 1225) having the determined width t are formed.

As described above, even when infrared rays are incident in an oblique direction on the light guiding paths 1212 to 1215 (1222 to 1225), the infrared rays are totally reflected to be guided to the light emitting portion 1021A (1022A). Therefore, the user is not required to operate the remote controller 1300 in front of the light guide module 1001, and can operate the television receiver 1100 through the remote controller 1300 in a position which is displaced from the front of the light guide module 1001.

In the case where it is not necessary to consider the size of the light guide module 1001, the slits 1021C, 1021D, 1021E (1022C, 1022D, 1022E) may not be disposed, and the whole sector shape of the body portion 1020 may be configured as a light guiding path.

Hereinafter, the guiding of infrared rays in the light guide module 1001 which is configured as described above will be described in detail. Also in the following description, only the light guiding plate 1021 will be described, and, with respect to the light guiding plates 1022, a corresponding reference numeral(s) is indicated in parentheses.

Figure 6A:
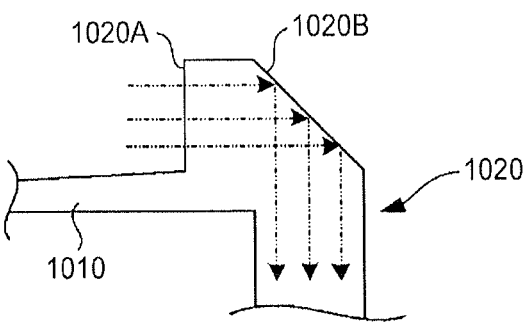
FIGS. 6(A) to 6(C) are views diagrammatically showing loci of guiding of infrared rays in the light guide module of the first embodiment.
Figure 6B:
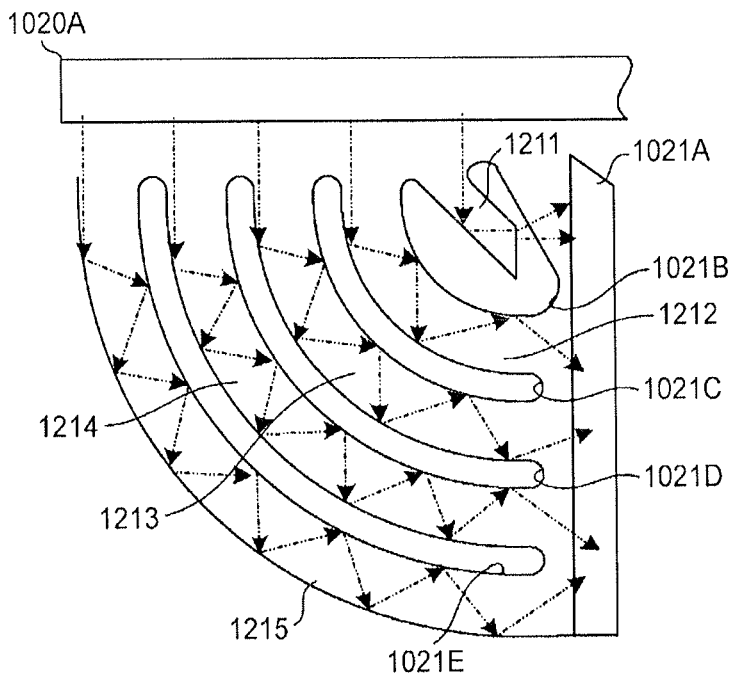
Figure 6C:
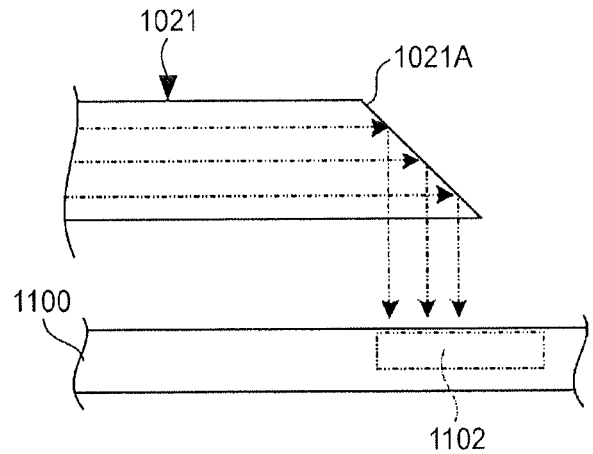

FIGS. 6(A) to 6(C) are views diagrammatically showing loci of guiding of infrared rays in the light guide module 1001. FIG. 6(A) shows a case where the loci of infrared rays between the light incident surface 1020A and the incident reflective surface 1020B are viewed from the lateral side. FIG. 6(B) shows a case where the loci of infrared rays in the light guiding paths 1211, 1212, 1213, 1214, 1215 (1221, 1222, 1223, 1224, 1225) are viewed from the front side. FIG. 6(C) shows a case where the loci of infrared rays in the light emitting portion 1021A (1022A) are viewed from the lower side.

As shown in FIG. 6(A), infrared rays which are incident through the light incident surface 1020A are reflected from the incident reflective surface 1020B, toward the lower side of the body portion 1020. At this time, in the case where the remote controller 1300 is operated in front of the light guide module 1001, the incidence angle of the infrared rays with respect to the light incident surface 1020A is 0 degrees, and the incident infrared rays are reflected in the vertically downward direction from the incident reflective surface 1020B. By contrast, in the case where the remote controller 1300 is operated in an oblique direction of the light guide module 1001, the infrared rays are incident on the light incident surface 1020A in an oblique direction. In this case, the infrared rays are reflected not in the vertically downward direction but in an obliquely downward direction, from the incident reflective surface 1020B.

As shown in FIG. 6(B), the infrared rays which are reflected by the incident reflective surface 1020B repeat total reflection in the light guiding paths 1211, 1212, 1213, 1214, 1215 (1221, 1222, 1223, 1224, 1225), and then move to the light emitting portion 1021A (1022A).

At this time, infrared rays which are incident through the vicinity of the longitudinal middle portion of the light incident surface 1020A are guided to the upper portion of the light emitting portion 1021A (1022A), by the light guiding paths 1211, 1212 (1221, 1222) and the like. As shown in FIG. 6(C), the infrared rays which are incident on the light emitting portion 1021A (1022A) are reflected by the light emitting portion 1021A (1022A) which forms an angle of about 45 degrees, to be emitted toward the back surface of the body portion 1020.

Moreover, a part of infrared rays which is emitted from the end portion of the light guiding path 1211 (1221) is refracted by the above-described inclined surface of the hole 1021B (1022B), directed also in an obliquely upward direction with respect to the width direction, and emitted from the upper portion of the light emitting portion 1021A (1022A) toward the back surface of the body portion 1020. There is a case where a space sufficient to form the arcuate slits cannot be ensured in the vicinity of the center of the light guiding plate 1021 (1022). In the case where infrared rays are incident through the vicinity of the longitudinal middle portion of the light incident surface 1020A, therefore, the infrared rays are not emitted from the upper portion of the light emitting portion 1021A (1022A). In this case, when the light receiving section 1102 of the television receiver 1100 is located in a position opposed to the portion from which infrared rays are not emitted, the light receiving section 1102 cannot receive the infrared rays. When the light guiding path 1211 (1221) is formed, therefore, it is possible to avoid this problem.

Infrared rays which are incident through the vicinity of the end portion in the longitudinal direction of the light incident surface 1020A are guided from the middle portion of the light emitting portion 1021A (1022A) to the lower portion, by the light guiding paths 1213, 1214, 1215 (1223, 1224, 1225) and the like. Then, the infrared rays which are incident on the light emitting portion 1021A (1022A) are reflected by the light emitting portion 1021A (1022A) which forms an angle of about 45 degrees, toward the back surface of the body portion 1020, and emitted. Moreover, infrared rays which are incident through the longitudinal middle portion of the light incident surface 1020A are caused to be emitted toward the back surface of the body portion 1020, by the inclined surface 1023.

As described above, the light guide module 1001 can emit the infrared rays which are incident through the light incident surface 1020A that is elongated in the width direction, from the light emitting portion 1021A (1022A) that is elongated in the other direction. Even when the height level of the light receiving section 1102 is varied depending on the kind of the television receiver 1100, therefore, infrared rays are emitted from the light emitting portion 1021A (1022A) that is elongated in the height direction, thereby enabling the light guide module 1001 to surely emit the infrared rays to the light receiving section 1102.

In the light guiding paths 1211, 1212, 1213, 1214, 1215 (1221, 1222, 1223, 1224, 1225), infrared rays are reflected at various angles, and advance in every direction. Therefore, infrared rays move also between the slits 1021C, 1021D, 1021E (1022C, 1022D, 1022E) and the light emitting portion 1021A (1022A), and are emitted therefrom through the light emitting portion 1021A (1022A). Consequently, infrared rays are emitted from the whole light emitting portion 1021A (1022A), and hence the light guide module 1001 can surely emit infrared rays to the light receiving section 1102.

As described with reference to FIG. 5, the light guiding paths 1211, 1212, 1213, 1214, 1215 (1221, 1222, 1223, 1224, 1225) are formed so that, even when infrared rays are incident in an oblique direction, the infrared rays are totally reflected. Even in the case where infrared rays are incident in an oblique direction on the light incident surface 1020A, therefore, the light guide module 1001 surely guides the infrared rays to the light emitting portion 1021A (1022A). Namely, the light guide module 1001 can emit infrared rays toward the television receiver 1100 not only when the user operates the remote controller 1300 in front of the light guide module 1001, but also when the user operates the remote controller in an oblique direction.

Although, in the above, the light guide module 1001 of the embodiment has been described, the specific configuration of the light guide module 1001 may be adequately changed in design. The functions and effects which are described in the above embodiment are a mere list of most favorable functions and effects produced by the invention. The functions and effects of the invention are not limited to those described in the above embodiment.

For example, the light guide module 1001 is configured by integrally forming the light guiding plates 1021, 1022 so as to form a semicircular shape. Alternatively, the light guide module may be configured by only one of the light guiding plate 1021 and the light guiding plate 1022. Furthermore, R=t×5 indicating the relationship between the radius R of the light guiding plates 1021, 1022 and the width t of the light guiding paths 1212, 1213, 1214, 1215 (1222, 1223, 1224, 1225) may be adequately changed in accordance with the incidence angle of infrared rays on the light incident surface 1020A.

The light guiding paths 1212, 1213, 1214, 1215 are formed into an arcuate shape. The invention is not limited to this. FIGS. 7(A) to 7(D) are views each showing the light guide module 1001 which has a light guiding path having a different shape. Although FIGS. 7(A) to 7(D) show only the side of the light guiding plate 1022 in FIG. 2(B), the side of the light guiding plate 1021 is similarly configured.

Figure 7A:
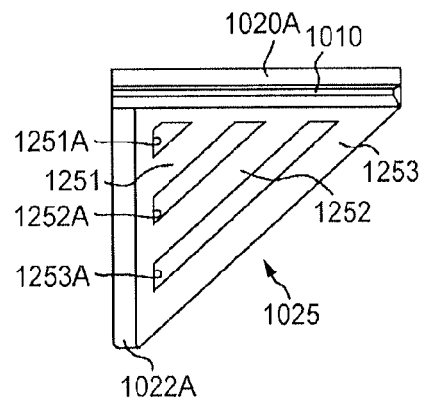
FIGS. 7(A) to 7(D) are views showing a light guide module of the first embodiment which has a light guiding path having a different shape.

As shown in FIG. 7(A), a light guiding plate 1025 which guides infrared rays incident through the light incident surface 1020A of the light guide module 1001 to the light emitting portion 1022A may be linear. When the light guide module 1001 is viewed from the front side, namely, the light incident surface 1020A, the light emitting portion 1022A, and the light guiding plate 1025 form a triangular shape. Slits 1251A, 1252A, 1253A which are inclined in the longitudinal directions of the light incident surface 1020A and the light emitting portion 1022A are formed in the light guiding plate 1025, and light guiding paths 1251, 1252, 1253 are formed between the slits 1251A, 1252A, 1253A.

Figure 7D:
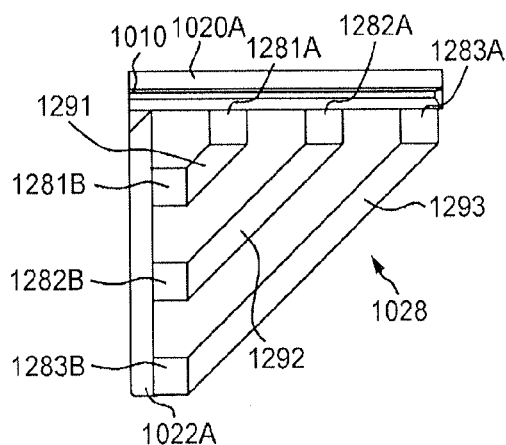
Figure 7B:
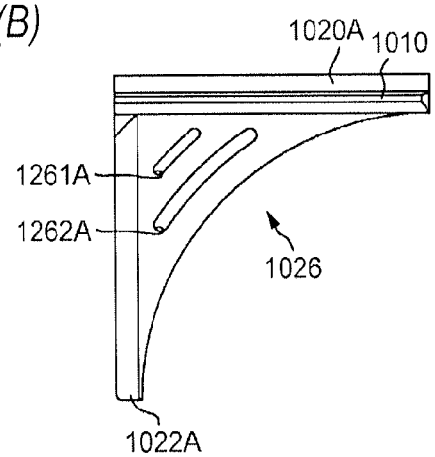

As shown in FIG. 7(B), a light guiding plate 1026 which guides infrared rays incident through the light incident surface 1020A of the light guide module 1001 to the light emitting portion 1022A may be arcuate. In this case, the light guiding plate 1026 has an arcuate shape which is swollen toward the sides of the light incident surface 1020A and the light emitting portion 1022A. Slits 1261A, 1262A are formed in the light guiding plate 1026, and light guiding paths 1261, 1262 are formed between the slits 1261A, 1262A.

Figure 7C:
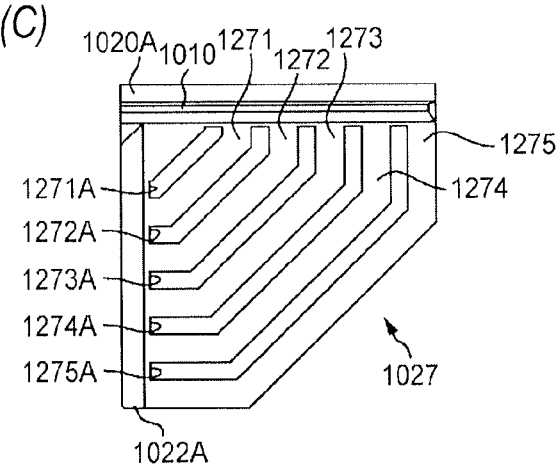

As shown in FIG. 7(C), a light guiding plate 1027 which guides infrared rays incident through the light incident surface 1020A of the light guide module 1001 to the light emitting portion 1022A may be polygonal. In FIG. 7(C), when the light guide module 1001 is viewed from the front side, the light incident surface 1020A, the light emitting portion 1022A, and the light guiding plate 1025 form a pentagonal shape. Slits 1271A, 1272A, 1273A, 1274A, 1275A having: a portion which extends along in the longitudinal directions of the light incident surface 1020A and the light emitting portion 1022A; and that which is inclined with respect to the light incident surface 1020A and the light emitting portion 1022A are formed in the light guiding plate 1027, and light guiding paths 1271, 1272, 1273, 1274, 1275 are formed between the slits 1271A, 1272A, 1273A, 1274A, 1275A.

As shown in FIG. 7(D), parts of light guiding paths may be formed by other members. A light guiding portion 1028 which guides infrared rays incident through the light incident surface 1020A of the light guide module 1001 to the light emitting portion 1022A has: light guiding path end portions 1281A, 1282A, 1283A; light guiding path end portions 1281B, 1282B, 1283B; and light guiding paths 1291, 1292, 1293 which connect the light guiding path end portions to each other, and a part of which is formed by a material that is different from that of the light guiding portion 1028. The light guiding path 1291 connects the light guiding path end portions 1281A, 1281B to each other. The light guiding path 1292 connects the light guiding path end portions 1282A, 1282B to each other. The light guiding path 1293 connects the light guiding path end portions 1283A, 1283B to each other. At this time, the light guiding paths 1291, 1292, 1293 may be configured in any way as far as they have characteristics of guiding light.

In this way, the configuration and the like of the light guiding plates which guide infrared rays incident from the light incident surface 1020A to the light emitting portion 1022A may be adequately changed.

Figure 8:
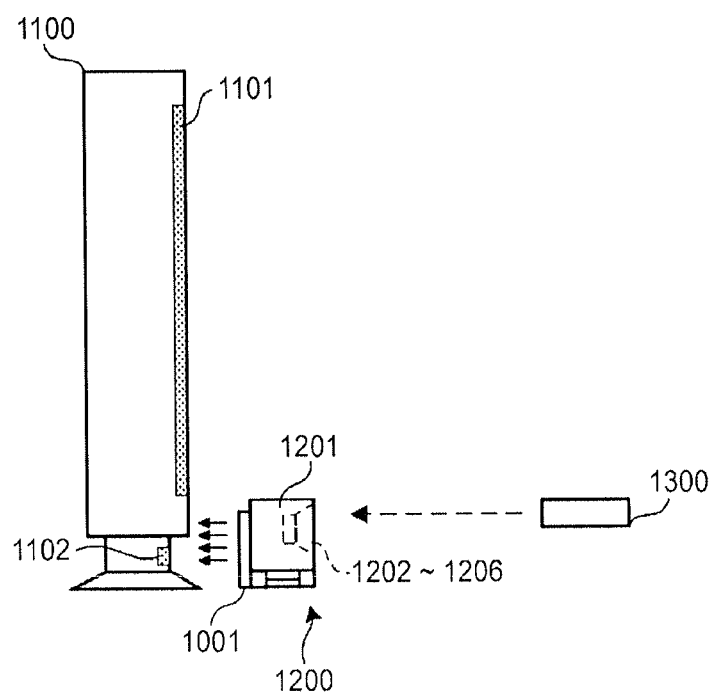
FIG. 8 is a diagram showing a mounting state in the case where the light guide module of the first embodiment is mounted upside down.

In the embodiment, the configuration where the light guide module 1001 is placed on the upper portion of the housing 1201 of the bar speaker 1200 has been described. Alternatively, as shown in FIG. 8, in the case where the bar speaker 1200 has leg portions, and a space exists below the bar speaker 1200, the light guide module 1001 may be mounted upside down.

Hereinafter, a light guide body (light guide module) of a second embodiment of the invention will be described.

Figure 9A:
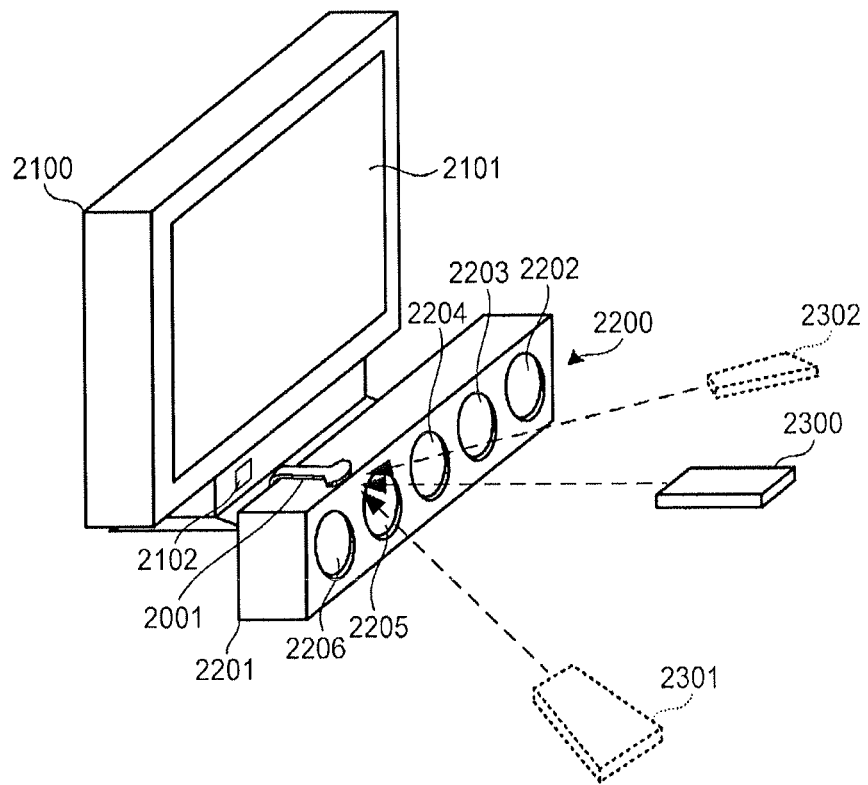
FIGS. 9(A) and 9(B) are views showing a mounting state of a light guide module of a second embodiment.
Figure 9B:
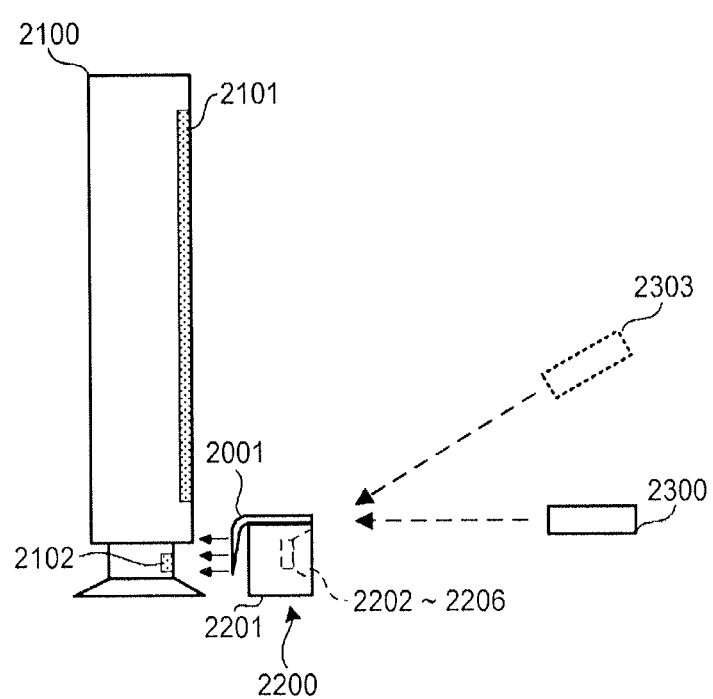

FIGS. 9(A) and 9(B) are views showing a mounting state of the light guide module of the second embodiment. FIG. 9(A) is a perspective view of a state where a bar speaker 2200 is mounted in front of a television receiver 2100, and FIG. 9(B) is a side view.

The bar speaker 2200 is mounted in front of the television receiver 2100. More specifically, the bar speaker 2200 is mounted in front of a television stand of the television receiver 2100, and so as not to overlap in the height direction with the display screen 2101 of the television receiver 2100.

The television receiver 2100 includes a light receiving section 2102 which receives an infrared signal (hereinafter, referred to as infrared rays) functioning as an operation signal. The infrared rays which are to be received by the light receiving section 2102 are transmitted from a remote controller 2300 for the television receiver 2100. The light receiving section 2102 is disposed below the display screen 2101. In the embodiment, the bar speaker 2200 is disposed so as to be opposed to a panel in which the light receiving section 2102 is disposed. Therefore, the light receiving section 2102 is shielded by the bar speaker 2200, and cannot directly receive the infrared rays from the remote controller 2300.

The bar speaker 2200 has a housing 2201 having a rectangular parallelepiped shape which is elongated in one direction. The bar speaker 2200 is mounted in front of the television receiver 2100 so that the longitudinal direction of the housing 2201 coincides with the width direction of the television receiver 2100, and one surface (hereinafter, this surface is referred to as back surface) of the housing 2201 is on the side of the television receiver 2100. The bar speaker 2200 includes a plurality of speakers 2202, 2203, 2204, 2205, 2206. The speakers 2202 to 2206 are disposed along the longitudinal direction of the surface (hereinafter, this surface is referred to as front surface) which is parallel to the back surface of the housing 2201. The bar speaker 2200 is connected to the television receiver 2100 through wirings which are not shown, receives an audio signal from the television receiver 2100, and forward emits sounds from the speakers 2202 to 2206.

A light guide module 2001 is mounted in the bar speaker 2200. As shown in FIG. 9(A), the light guide module 2001 is mounted in a position which coincides with the light receiving section 2102 of the television receiver 2100 in the width direction, and along the upper and back surfaces of the housing 2201 of the bar speaker 2200. The light guide module 2001 is configured so that, when the remote controller 2300 is operated, and the infrared rays irradiated in front of the bar speaker 2200 are incident as indicated by the broken-line arrow in FIG. 9(B), the infrared rays repeat total reflection inside the module, and are emitted in the depth direction (the solid-line arrow in FIG. 9(B)) of the housing 2201.

The infrared rays emitted from the light guide module 2001 are received by the light receiving section 2102 of the television receiver 2100. In this way, even when the light receiving section 2102 is shielded by the bar speaker 2200, the television receiver 2100 can receive the infrared rays through the light guide module 2001.

Figure 10:
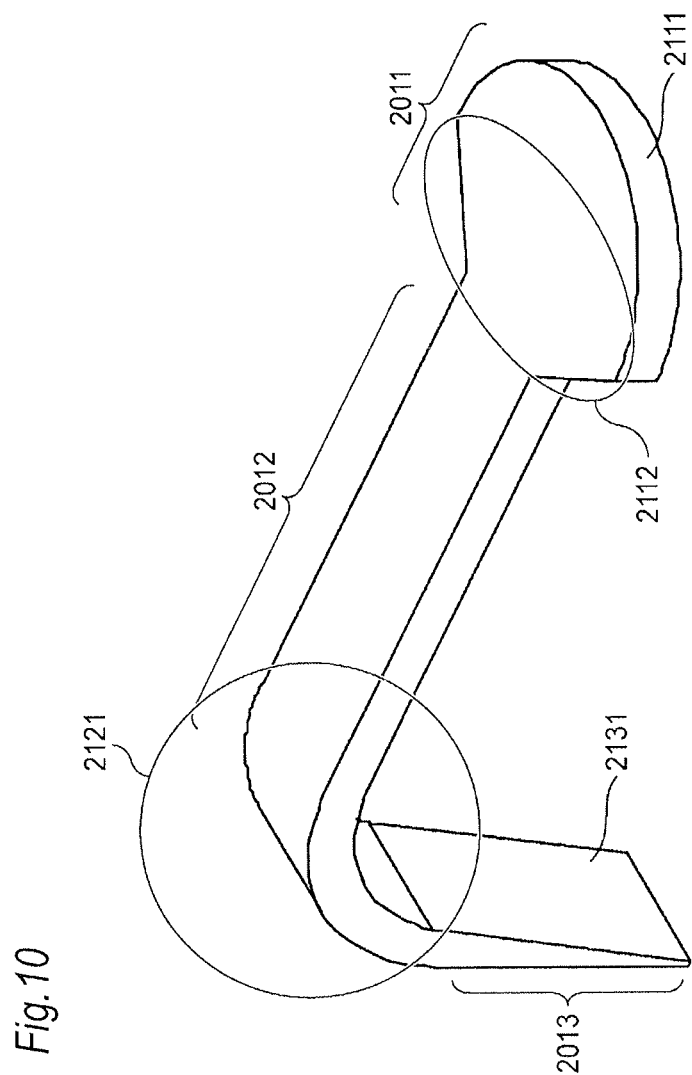
FIG. 10 is an external perspective view of the light guide module of the second embodiment.
Figure 11A:
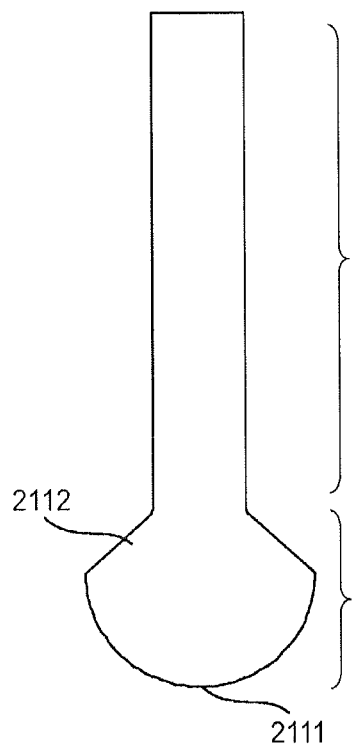
FIG. 11(A) is a top view of the light guide module of the second embodiment.
Figure 11B:
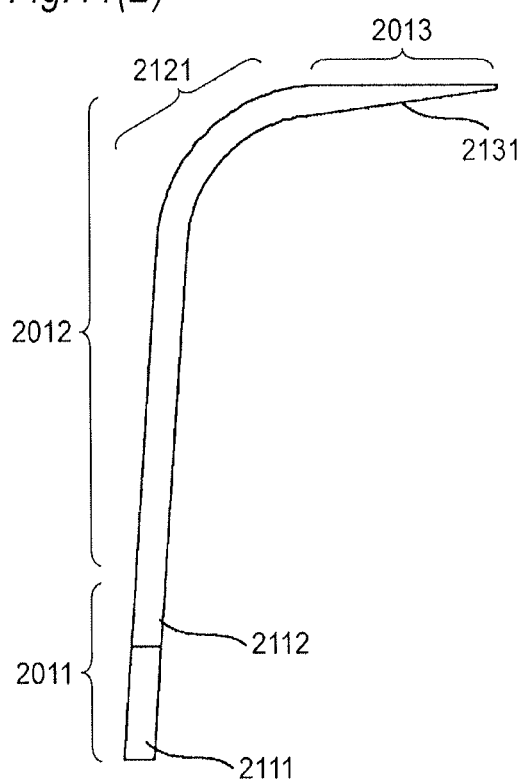
FIG. 11(B) is a side view.
Figure 11C:
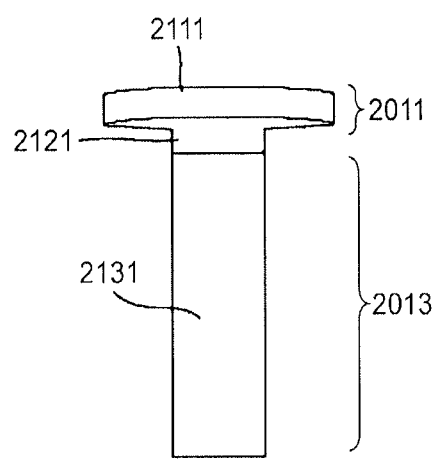
FIG. 11(C) is a front view.

FIG. 10 is an external perspective view of the light guide module 2001, FIG. 11(A) is a top view of the light guide module 2001, FIG. 11(B) is a side view, and FIG. 11(C) is a front view.

The light guide module 2001 is a transparent member (for example, an acrylic resin) having a thin plate-like shape, and configured by a light incident portion 2011, a light guiding portion 2012, and a light emitting portion 2013. In the light guide module 2001, one tip end constitutes the light incident portion 2011, and the other tip end constitutes the light emitting portion 2013. The light guide module 2001 is placed on the bar speaker 2200 so that the lower surface of the light guiding portion 2012 is in contact with the upper surface of the housing 2201. The light incident portion 2011 is mounted while being directed toward the front of the housing 2201, and the light emitting portion 2013 is mounted on the back surface of the housing 2201.

The light guiding portion 2012 has a shape in which the portion is arcuately bent by about 90 degrees in the midpoint of the extension in the depth direction, and is elongated in the height direction. The arcuately bent part constitutes an arcuate light guiding path 2121. Therefore, the light guide module 2001 is mounted along the upper and back surfaces of the housing 2201.

The light incident portion 2011 is configured by a curved light incident surface 2111 which is wide in the width direction, and which is narrow (thin) in the height direction, and a squeezed portion 2112. The light incident surface 2111 has a shape which is semicircular (a sector shape having a central angle of about 180 degrees) in a top view, and receives infrared rays which arrive from the normal direction of the semicircle. In the light incident portion 2011, the squeezed portion 2112 is disposed in the back surface of the light incident surface 2111. The squeezed portion 2112 has a shape which is trapezoidal in a top view, and in which the width of the light incident portion 2011 is gradually reduced as advancing from the light incident surface 2111 to the light guiding portion 2012. In this example, the width of the light incident portion 2011 is linearly reduced by the squeezed portion 2112. Infrared rays which are incident through the light incident surface 2111 are guided to the light guiding portion 2012 while being reflected by the interface (contact surface with air) inside the squeezed portion 2112.

Figures 12A, 12B:
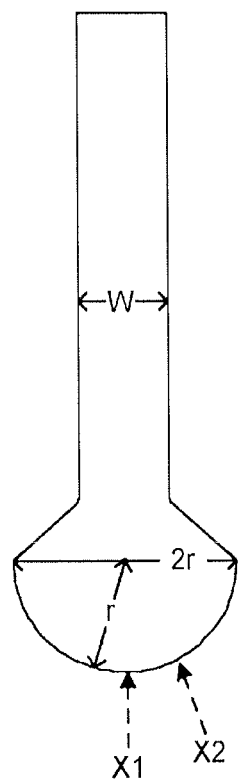
FIGS. 12(A) and 12(B) are diagrams illustrating the dimensions of a light incident portion.

A technique for determining the dimensions of the light incident portion 2011 will be described with reference to the top view of FIG. 12(A) and the table of FIG. 12(B). In this example, the light incident surface 2111 is semicircular in a top view, and therefore, when it is assumed that the radius of the semicircle is r, the width of the light incident surface 2111 is 2r. When it is assumed that the width of the light guiding portion 2012 is W, the width of the light incident portion 2011 is squeezed from 2r to W by the squeezed portion 2112.

Here, for example, it is assumed that W=2r. When the amount of light which is guided to the light guiding portion 2012 in the case where size reduction is not performed by the squeezed portion 2112 is set as a reference (light amount 1), the width W is reduced (or the radius r is increased), and the squeezed portion 2112 is disposed (size reduction is enhanced), also infrared rays which are incident in a direction other than the front direction are reflected by the side surface of the squeezed portion 2112 to be guided to the light guiding portion 2012, and therefore the amount of light which is guided to the light guiding portion 2012 is increased. As shown in the table of FIG. 12(B), when W=2r×0.9, for example, the amount of light which is guided to the light guiding portion 2012 is about 2 times in the case where the remote controller 2300 is operated in the front direction X1, and the amount of light which is guided to the light guiding portion 2012 is about 1.2 times in the case where the remote controller 2300 is operated in a direction X2 of 20 degrees.

In the case where the remote controller 2300 is operated in the front direction X1, the smaller W (or the larger the radius r) to enhance the size reduction, the larger the light amount. By contrast, in the case where the remote controller 2300 is operated in a direction other than the front direction, when W is excessively reduced (or the radius r is excessively increased), the infrared rays which are incident through the light incident surface 2111 is directed vertically to the side surface of the squeezed portion 2112, and the amount of infrared rays which are emitted from the side surface is increased. Therefore, the amount of light which is guided to the light guiding portion 2012 is reduced. In this example, it has been confirmed that, in the case of W=2r×0.1, when the remote controller 2300 is operated in the direction X2 of 20 degrees, the amount of light which is guided to the light guiding portion 2012 is substantially 0 as shown in the table of FIG. 12(B).

With respect to the width W and the radius r, therefore, it is preferable to determine the width of the light guiding portion so that a large light amount is guided to the light guiding portion 2012 also when the remote controller is operated in a direction other than the front direction. In this example, it has been confirmed that, in the case of W=2r×0.4, when the remote controller 2300 is operated in the direction X2 of 20 degrees, the amount of light which is guided to the light guiding portion 2012 is maximum as shown in the table of FIG. 12(B). In the light guide module 2001 of the embodiment, also when the remote controller 2300 is operated at an angle which is larger than 20 degrees, a light amount of a degree at which infrared rays can be emitted from the light emitting portion 2013 is obtained. It is configured so that, even when the remote controller 2300 is operated in a range of ±60 degrees, for example, infrared rays from the remote controller 2300 are emitted toward the back surface of the housing 2201. Namely, it is configured so that, in the case where the incidence angle of infrared rays from the remote controller 2300 located in front of the light guide module 2001 as shown in FIG. 9(A) is 0 degrees, also infrared rays from a remote controller 2301 or remote controller 2302 the position of which is moved rightward or leftward by 60 degrees in the horizontal direction can be emitted toward the back surface of the housing 2201. Therefore, the user can operate the remote controller in a position of the wide range extending about the light guide module 2001.

Figure 13:
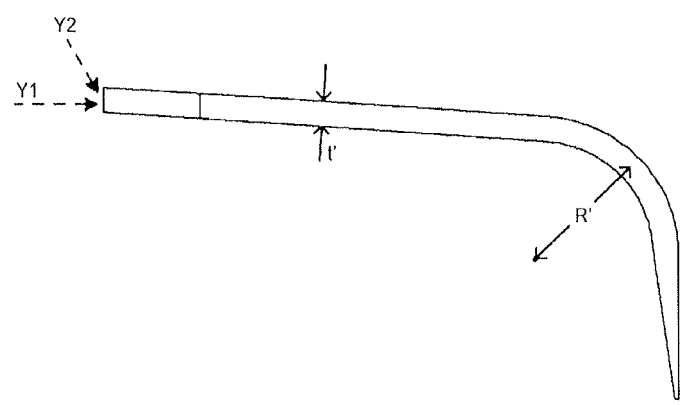
FIG. 13 is a view diagrammatically illustrating the dimensions of a light guiding path.

Next, a technique for determining the dimensions of the arcuate light guiding path 2121 will be described with reference to the side view of FIG. 13. In this example, it is assumed that the thickness of the light guiding portion 2012 is t', and the radius of the arcuate light guiding path 2121 is R'.

In the arcuate light guiding path 2121, in order to cause the infrared rays advancing in the light guiding portion 2012 to be totally reflected by the interface, it is preferable that the radius R' is increased, and the infrared rays move toward the interface with respect to the light guiding portion 2012 at an angle which is as close to horizontal as possible. When the radius R' of the arc is large, however, the size of the whole light guide module 2001 becomes large. Particularly, the length in the height direction of the light guide module 2001 must be shorter than the height of the housing 2201 of the bar speaker 2200. When the radius R' is large, therefore, the length in the height direction of the light emitting portion 2013 is shortened. Preferably, therefore, the radius R' is as small as possible.

Moreover, the larger the thickness t', the larger the thickness of the light incident portion 2011. Even when the remote controller 2300 is moved from the horizontal surface in the height direction (a remote controller 2303 in FIG. 9(B)), therefore, infrared rays from the remote controller 2303 can be guided with a large amount of light.

However, the smaller the radius R' and the larger thickness t', the closer the angle to vertical by which the infrared rays in the light guiding portion advances to the interface. Therefore, there is a higher possibility that infrared rays are emitted from the arcuate light guiding path 2121, and cannot not be guided to the light emitting portion 2013.

In the arcuate light guiding path 2121, therefore, the thickness t' and the radius R' are required to be reduced to a degree at which infrared rays can be totally reflected even in the case where the remote controller is operated at a certain angle (for example, a direction Y2 of 60 degrees in the height direction) with respect to the horizontal direction Y1. In the light guide module 2001 of the embodiment, it has been confirmed that, in the case where the thickness t' is about 4 mm, and the radius R' is about four times the thickness t', infrared rays from a remote controller which is operated at 60 degree in the height direction can be guided to the light emitting portion 2013.

Next, the light emitting portion 2013 will be described. In the light emitting portion 2013, a reflection pattern 2131 is disposed on a surface opposed to the surface from which infrared rays are emitted. The reflection pattern 2131 has characteristics of causing infrared rays to be diffusely reflected, and is formed by, for example, surface treatment or printing in which minute asperities are disposed on the surface of the opposed plane. When the infrared rays which are guided from the light guiding portion 2012 to the light emitting portion 2013 impinge on the reflection pattern 2131, the infrared rays are reflected toward the plane opposed to the reflection pattern 2131, and emitted to the back surface (the depth direction of the housing 2201) of the light emitting portion 2013 while being radially spread. Because the infrared rays are emitted while being radially spread, the infrared rays can be received by the light receiving section 2102 even when the light emitting portion 2013 is not opposed to the light receiving section 2102 of the television receiver 2100 and is disposed in a position which is slightly displaced in the width direction.

Since the light emitting portion 2013 has the shape which is elongated in the height direction, the portion can emit infrared rays to a wide range in the height direction. Even when the light receiving section 2102 of the television receiver 2100 exists in any height position, therefore, infrared rays can be received by the light receiving section 2102.

Moreover, the light emitting portion 2013 in the embodiment has a shape which is thinner as further separating from the light guiding portion 2012. The infrared rays which are guided to the light emitting portion 2013 advance through the inside of the light emitting portion 2013 while being partly emitted by the reflection pattern 2131. Therefore, the remoter from the light guiding portion, the smaller the light amount so that the amount of the emitted light is reduced. When, as described above, the light emitting portion 2013 is taperingly squeezed, and more thinned as further separating from the light guiding portion 2012, therefore, the rate of light reflected by the reflection pattern 2131 is more increased as is further remote from the light guiding portion 2012, so that the emission is performed at a uniform light amount.

However, the squeezing into a tapered shape is not an essential element of the invention, and a uniform thickness may be employed.

Furthermore, the reflection pattern is not limited to the above-described surface treatment for forming asperities, and may be a mode where the pattern is formed by applying (printing) a light reflective paint in a predetermined pattern.

Furthermore, as the reflection pattern, various patterns, for example, gradation such as shown in FIG. 14(A), a linear pattern such as shown in FIG. 14(B), and a dot pattern such as shown in FIG. 14(C) may be employed.

Preferably, the density of the reflection pattern is made higher as further separating from the light guiding portion 2012. In this case, both squeezing into a tapered shape, and increasing of the density of the reflection pattern may be performed. In place of squeezing into a tapered shape, increasing of the density of the reflection pattern may be performed, or only squeezing into a tapered shape may be performed while maintaining the density of the reflection pattern uniform.

Furthermore, the reflection pattern may be produced also by causing an acrylic resin to contain an impurity which diffusely reflects light, in a manner that its concentration is higher as further separating from the light guiding portion 2012.

Furthermore, the shape of the light incident surface 2111 is not limited to the above-described arcuate (a sector shape having a central angle of about 180 degrees) shape. For example, a mode may be possible where a polygonal light incident surface such as a light incident surface having three flat surfaces such as shown in FIG. 15(A) or that having five flat surfaces such as shown in FIG. 15(B) may be employed.

Furthermore, the light incident surface 2111 and squeezed portion 2112 which are described above have the plate-like shape which is narrow (thin) in the height direction. Alternatively, the light incident portion 2011 may have a curved (semispherical) shape which is thick in the height direction, or a polygonal shape configured by a plurality of flat surfaces. In this case, the squeezed portion 2112 has a shape in which not only the thickness in the width direction but also that in the height direction are gradually reduced over the range from the side of the light incident surface 2111 to the light guiding portion 2012.

Figure 16:
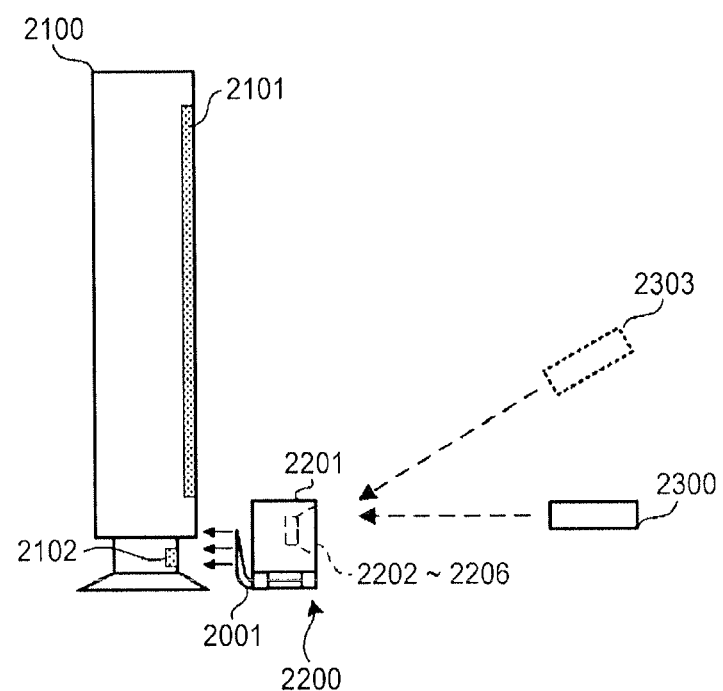
FIG. 16 is a diagram showing a mounting state in the case where the light guide module of the second embodiment is mounted upside down.

In the embodiment, the configuration where the light guide module 2001 is placed on the upper portion of the housing 2201 of the bar speaker 2200 has been described. Alternatively, as shown in FIG. 16, in the case where the bar speaker 2200 has leg portions, and a space exists below the bar speaker 2200, the light guide module 2001 may be mounted upside down.

The application is based on Japanese Patent Application (No. 2011-114024) filed May 20, 2011 and Japanese Patent Application (No. 2011-136545) filed Jun. 20, 2011, and their disclosures are incorporated herein by reference.

The invention claimed is:

1. A light guide system, comprising:
   a speaker apparatus having a front side and a rear side; and
   a light guide body arranged on the speaker apparatus, the light guide body having:
      a light incident portion having a shape that elongated and is configured to receive light being emitted toward the front side of the speaker apparatus;
      a light guiding portion configured to guide the light received by the light incident portion; and
      a light emitting portion arranged at the rear side of the speaker apparatus so as not to directly receive the light emitted toward the front side of the speaker apparatus, the light emitting portion configured to emit the light away from the rear side of the speaker apparatus to an external receiver,
   wherein the light incident portion is extended in a width direction, and the light incident portion has a light incident surface on which the light being emitted toward the front side of the speaker apparatus is incident, and the light incident portion has a shape that is elongated in the width direction and connects to a first end of the light guiding portion, and
   wherein the light emitting portion is extended in a height direction which is perpendicular to the width direction, and the light emitting portion has a light emitting surface which has a shape that is elongated in the height direction and connects to a second end of the light guiding portion, and a width of the light emitting portion is smaller than a width of the light incident portion and the light emitting portion concentrates and emits the light in a vertical manner along the height direction.

2. The light guide system according to claim 1, wherein the light guide body further includes:
   a reflective portion having a reflective surface which is disposed in opposition to the light incident surface and which is adapted to reflect the light incident on the light incident surface to the light guiding path, and
   the light guiding path is adapted to guide the light reflected by the reflective surface to the light emitting surface.

3. The light guide system according to claim 2, wherein the light emitting surface is adapted to emit the light in a direction of travel of the light incident surface on a side of the reflective surface.

4. The light guide system according to claim 1, wherein the light guiding portion is a light guide member in which the light incident surface and the light emitting surface are formed,
   a plurality of slits are formed in the light guide member, and the light guiding path is defined between the plurality of slits.

5. The light guide system according to claim 4, wherein the light guide member has a sector shape having a central angle of approximately 90 degrees,
   the light incident surface and the reflective surface are formed in linear portions of the sector shape of the light guide member, and
   the plurality of slits have an arcuate shape which is centered at an intersection of the two linear portions, the intersection being a center part of the sector shape of the light guide member.

6. The light guide system according to claim 5, wherein the light guiding path has a width which is determined by a radius of the arcuate shape of the slits.

7. The light guide system according to claim 6, wherein the light guiding path has a linear light guiding path which is disposed in a vicinity of the center part of the sector shape of the light guide member, which is adapted to guide the light reflected by the reflective surface to the light emitting surface, and which has a linear shape.

8. The light guide system according to claim 4, including two light guide members each of which is formed with the light incident surface and the light emitting surface, wherein
   the two light guide members are integrally formed so that the light emitting surfaces of the light guide members are opposed to each other, and the two light guide members are bilaterally symmetric about a straight line which is elongated along between the opposed light emitting surfaces.

* * * * *